(12) United States Patent
Abe et al.

(10) Patent No.: US 9,574,906 B2
(45) Date of Patent: Feb. 21, 2017

(54) MAGNETIC MEDIUM FOR MAGNETIC ENCODER, MAGNETIC ENCODER AND METHOD FOR MANUFACTURING MAGNETIC MEDIUM

(71) Applicant: HITACHI METALS, LTD., Tokyo (JP)

(72) Inventors: Yasunori Abe, Mishima-gun (JP); Makoto Kawakami, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 72 days.

(21) Appl. No.: 14/523,182

(22) Filed: Oct. 24, 2014

(65) Prior Publication Data

US 2015/0115939 A1    Apr. 30, 2015

(30) Foreign Application Priority Data

Oct. 28, 2013  (JP) ................................. 2013-223166
Oct. 24, 2014  (JP) ................................. 2014-217577

(51) Int. Cl.
| | | |
|---|---|---|
| *H01F 13/00* | (2006.01) | |
| *H01F 41/00* | (2006.01) | |
| *G01D 5/16* | (2006.01) | |
| *G01D 5/20* | (2006.01) | |

(52) U.S. Cl.
CPC .............. *G01D 5/16* (2013.01); *G01D 5/2033* (2013.01); *H01F 13/00* (2013.01); *H01F 41/00* (2013.01); *Y10T 29/4902* (2015.01)

(58) Field of Classification Search
CPC ................................. H01F 13/00; H01F 41/00
USPC .......................................................... 324/207
See application file for complete search history.

(56) References Cited

U.S. PATENT DOCUMENTS

| | | | |
|---|---|---|---|
| 4,429,276 A | | 1/1984 | Narimatsu et al. |
| 5,998,989 A | * | 12/1999 | Lohberg .................. G01P 3/487 |
| | | | 324/174 |
| 6,222,361 B1 | * | 4/2001 | Shimano ................ G01R 33/09 |
| | | | 324/207.21 |
| 2007/0035293 A1 | * | 2/2007 | Fukuoka ............ G01D 5/24438 |
| | | | 324/207.21 |
| 2009/0262466 A1 | * | 10/2009 | Kurata ................... B82Y 25/00 |
| | | | 360/324 |
| 2010/0052664 A1 | | 3/2010 | Nishizawa et al. |
| 2010/0231204 A1 | | 9/2010 | Tenbrink et al. |

(Continued)

FOREIGN PATENT DOCUMENTS

| | | |
|---|---|---|
| EP | 0585009 A2 | 3/1994 |
| EP | 2267413 A1 | 12/2010 |

(Continued)

OTHER PUBLICATIONS

Communication dated Mar. 11, 2015 from the European Patent Office in counterpart application No. 14190421.9.

*Primary Examiner* — Son Le
*Assistant Examiner* — Akm Zakaria
(74) *Attorney, Agent, or Firm* — Sughrue Mion, PLLC

(57) ABSTRACT

The present disclosure provides a magnetic medium, a magnetic encoder, and a method for manufacturing a magnetic medium with high reliability that can obtain the sufficient signal output, while reducing the hysteresis error. The magnetic medium is relatively movable with respect to a magnetic sensor for detecting a magnetic field in a magnetosensitive face.

10 Claims, 10 Drawing Sheets

(56) References Cited

U.S. PATENT DOCUMENTS

| | | | | |
|---|---|---|---|---|
| 2013/0127457 A1* | 5/2013 | Musha | ............... | B82Y 25/00 |
| | | | | 324/252 |
| 2013/0257422 A1* | 10/2013 | Koike | ............... | G01R 33/093 |
| | | | | 324/225 |
| 2013/0335847 A1* | 12/2013 | Shiroishi | ............... | G11B 5/02 |
| | | | | 360/46 |

FOREIGN PATENT DOCUMENTS

| JP | 55-59314 A | 5/1980 |
|---|---|---|
| JP | 60-162919 A | 8/1985 |
| WO | 2009/044840 A1 | 4/2009 |

\* cited by examiner

MAGNETIC MEDIUM FOR MAGNETIC ENCODER, MAGNETIC ENCODER AND METHOD FOR MANUFACTURING MAGNETIC MEDIUM

CROSS REFERENCE TO RELATED APPLICATIONS

This patent application claims the benefit of priority from Japanese Patent Application No. 2013-223166 filed on Oct. 28, 2013, the entire contents of which are incorporated herein by reference thereto.

BACKGROUND OF THE INVENTION

Field of the Invention

The present disclosure relates to a magnetic encoder for detecting a movement direction or movement amount of a moving member, or a rotation angle of a rotary body using a change in magnetism, a magnetic medium used for the magnetic encoder, and a method for manufacturing the same.

Description of the Related Art

Encoders are used in devices/apparatuses that require a precise control of the movement direction, movement amount, rotation angle, or the like.

The encoders are mainly classified into an optical encoder and an electromagnetic induction encoder based on the principle of operation.

The optical encoder is advantageously less likely to be affected by a peripheral magnetic field, but disadvantageously more likely to be contaminated by dust, oil, or the like. On the other hand, the electromagnetic induction encoder can also advantageously be used even under environment with dust or powder dust. Therefore, not the optical encoder, but the electromagnetic induction encoder is suitable for use in vehicle-mounted controllers that are used under an environment with much dust or oil, such as a motor for power, an electric power steering, or various types of valves.

Such a magnetic encoder basically includes a magnetic sensor, and a magnetic medium that relatively moves with respect to the magnetic sensor. The magnetic medium is a bond magnet or sintered body made of ferromagnetic material, such as ferrite. The magnetic medium is magnetized to cause a change in magnetic field in the magnetic sensor.

Normally, a magnetoresistive effect element used in the magnetic encoder detects only a magnetic field in parallel with a magnetosensitive face that can detect the magnetic field. The magnetoresistive effect element has its electric resistance changed according to an angle formed between a magnetosensitive axis and an in-plane component of the external magnetic field in the magnetosensitive face (the face which can sense only a component of the magnetic field which is parallel to the face), and calculates a strength of a leakage magnetic field from the change in electric resistance. The magnetic medium is signal-magnetized in such a manner that N and S are reversed, and when moving the above-mentioned magnetic sensor along a signal-magnetized surface of the thus-obtained magnetic medium, an output from the magnetic sensor follows a sine wave.

Conventionally, the following methods are performed on a magnetic medium for the purpose of fabricating the above-mentioned magnetic encoder using the magnetoresistive effect element that detects the magnetic field in the magnetosensitive face to output the change in electric resistance according to the angle between the magnetosensitive axis and the in-plane component of the external magnetic field in the magnetosensitive face: (I) a method involving only signal magnetization, (II) a method involving applying a bias magnetic field, while performing signal magnetization, and (III) a method involving performing both the bias magnetization and the signal magnetization.

SUMMARY OF THE INVENTION

In the method I), however, in performing only the signal magnetization on the magnetic medium, when detecting a leakage magnetic field from the magnetic medium by a magnetic sensor, such as an AMR sensor or a GMR sensor, the magnetic field applied to the magnetosensitive face of the magnetic sensor becomes substantially "0 (zero)", that is, a magnetic component in the in-plane direction of the magnetosensitive face becomes "0 (zero)" in a region at an interface where the magnetization direction of the magnetic medium changes. Thus, hysteresis (coercive force) of the magnetic sensor disadvantageously causes a hysteresis error in the magnetic encoder.

In order to solve the above problems, the method II) has been considered which involves performing signal magnetization on the magnetic medium, and further applying a bias magnetic field in a direction perpendicular to the magnetic field caused by the signal magnetization. In this way, the bias magnetic field is applied in the direction perpendicular to the signal magnetization, whereby the in-plane component of the bias magnetic field in the magnetosensitive face can reduce the hysteresis error of the magnetic sensor in the region where the in-plane magnetic component of the signal magnetic field in the magnetosensitive face is almost eliminated (JP 55-59314 A). However, in order to apply the bias magnetic field to the signal magnetic field, a magnet or the like needs to be newly provided in the magnetic sensor and/or magnetic medium, which leads to an increase in size and cost of the magnetic sensor and/or magnetic medium. Further, it is difficult to effectively apply the bias magnetic field to the signal magnetic field region from the viewpoint of design.

The method III) that involves the bias magnetization and the signal magnetization on the magnetic medium corrects the defects of the method II). For example, JP 60-162919 A uniformly performs the bias magnetization on the entire magnetic medium, and then the signal magnetization. Actually, however, when the signal magnetization is performed in a fine region, such as a signal pitch, of the magnetic medium with a magnetic layer uniformly magnetized, the magnetic medium is difficult to magnetize, and the bias leakage magnetic field from the bias magnetization region is so strong as compared to the signal leakage magnetic field from the signal magnetization region, which cannot obtain a sufficient signal output.

SUMMARY OF THE INVENTION

The present disclosure has been made in view of the foregoing circumstances, and it is an object of the present disclosure to provide a magnetic medium, a magnetic encoder, and a method for manufacturing the magnetic medium with high reliability that can obtain sufficient signal output, while reducing the hysteresis error.

The present disclosure provides a magnetic medium relatively movable with respect to a magnetic sensor for detecting a magnetic field in a magnetosensitive face, the magnetic medium including: a signal magnetization region including a first magnetization region magnetized in a first direction being in parallel with the magnetosensitive face and a second magnetization region magnetized in a second direction opposed to the first direction, the first magnetization region and the second magnetization region being alternately arranged along the first direction or the second direction; and a bias magnetization region magnetized in a third direction, the third direction intersecting both the first and second directions (preferably, perpendicularly), and being in parallel with the magnetosensitive face, wherein while a surface of the magnetic medium opposed to the magnetic sensor is placed to face upward, the bias magnetization region is formed under the first magnetization region and the second magnetization region near an interface between the first magnetization region and the second magnetization region, and no bias magnetization regions are formed under the first magnetization region near a center of the first magnetization region and under the second magnetization region near a center of the second magnetization region.

Both the signal magnetization region and the bias magnetization region are not preferably magnetized up to a lower surface of the magnetic medium.

A maximum magnetization depth of the signal magnetization region is preferably deeper than a maximum magnetization depth of the bias magnetization region.

The magnetic sensor includes a magnetoresistive effect element possessing a hysteresis error, and being designed to detect a magnetic field in a magnetosensitive face of the magnetoresistive effect element. The magnetic encoder preferably includes the magnetic sensor, and the magnetic medium moving relatively to the magnetic sensor.

In the magnetic encoder, it is preferred that a cyclic signal leakage magnetic field generated from the signal magnetization region is applied to the magnetic sensor, while a bias leakage magnetic field generated from the bias magnetization region is applied to the magnetic sensor by allowing the magnetic medium to move relatively to the magnetic sensor.

The magnetoresistive effect element is preferably at least one selected from the group consisting of: an anisotropic magnetoresistive effect element; a giant magnetoresistive effect element; a coupled magnetoresistive effect element; a spin valve giant magnetoresistive effect element; and a tunneling magnetoresistive effect element.

A method for manufacturing a magnetic medium in another aspect of the present invention is provided for manufacturing a magnetic medium which includes a signal magnetization region having a first magnetization region magnetized in a first direction being in parallel with a magnetosensitive face and a second magnetization region magnetized in a second direction opposed to the first direction, the first magnetization region and the second magnetization region being alternately arranged along the first direction or the second direction; and a bias magnetization region magnetized in a third direction, the third direction intersecting both the first and second directions (preferably, perpendicularly) and being in parallel with the magnetosensitive face.

The manufacturing method includes the steps of:

bias-magnetizing the magnetic medium in the third direction; and signal-magnetizing the magnetic medium so that a magnetization direction is reversed to be directed alternately in the first direction and in the second direction opposed to the first direction in a predetermined cycle.

The signal magnetization and the bias magnetization preferably magnetize the magnetic medium from its upper surface using a magnetic head for controlling a magnetic field with magnetization current.

The magnetic field strength for magnetizing the signal magnetization region is preferably twice or more as strong as the magnetic field strength for magnetizing the bias magnetization region.

The magnetic head includes a magnetic yoke made of soft magnetic material, and a coil generating a magnetic field in the magnetic yoke by allowing a magnetization current to flow therethrough. The magnetic yoke has both ends thereof forming a certain gap length therebetween and generating the magnetic field. The gap length in performing the signal magnetization is preferably smaller than a pitch (cycle) of the signal magnetization.

The present disclosure provides a magnetic medium, a magnetic encoder, and a method for manufacturing a magnetic medium with high reliability that can obtain the sufficient signal output, while reducing the hysteresis error.

Figure 1:
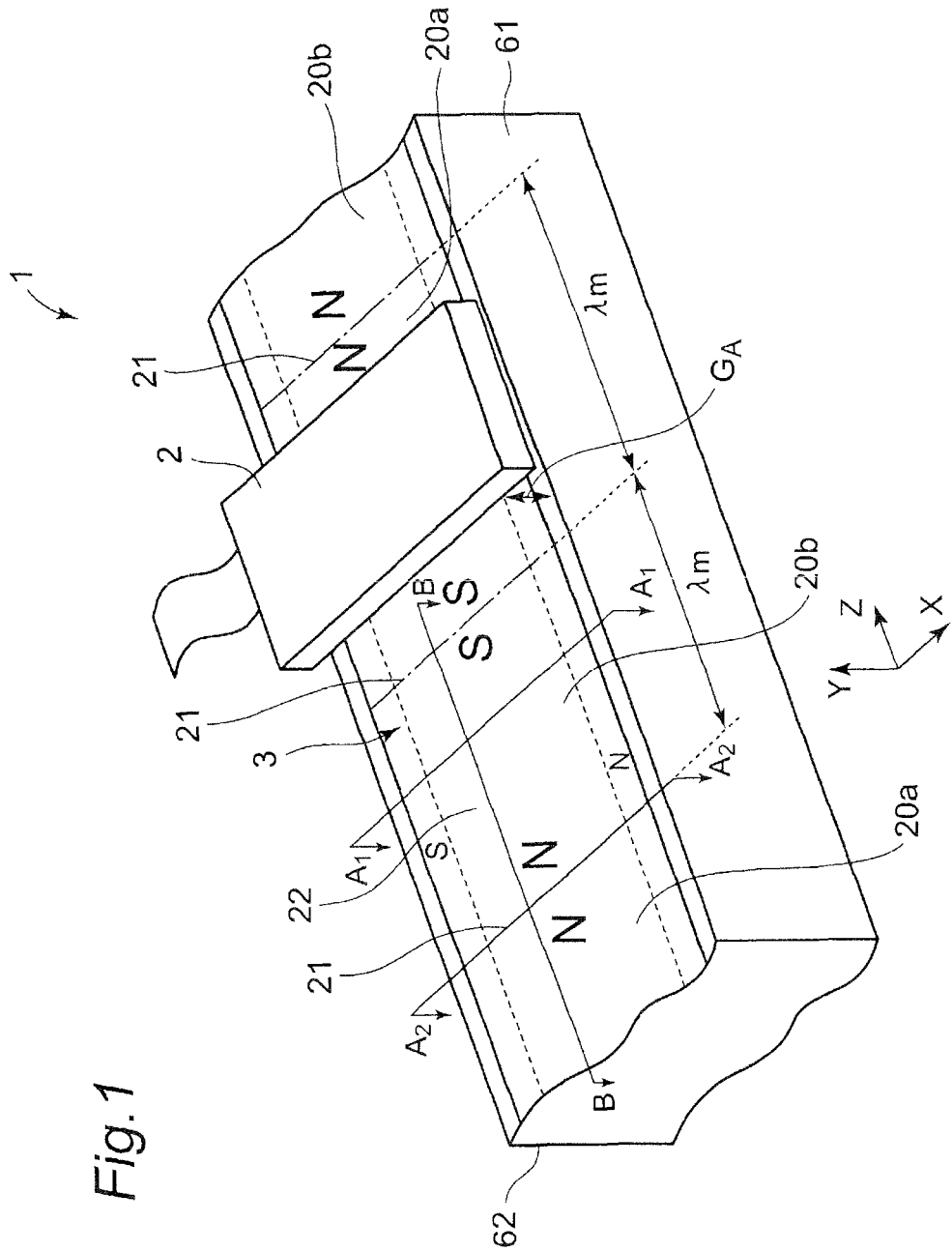
FIG. 1 is a schematic diagram of a linear magnetic encoder according to one embodiment of the present invention.

These drawings in FIGS. 1 to 10 are illustrative for the present invention, and thus the scope of the present invention should not be limited by them.

DETAILED DESCRIPTION OF THE INVENTION

Preferred embodiments of the present invention will be described in detail below with reference to the accompanying drawings. The embodiments mentioned below are illustrative for the present invention, and thus the scope of the present invention should not be limited by them. In the description below, if necessary, the terms indicative of the specific direction or position (for example, "upper", "lower", "right", "left", and other words including these words) are used for easy understanding of the present disclosure with reference to the figures. The meanings of the terms do not limit the technical scope of the present invention. The present disclosure uses the terms "deep" or "shallow". While a surface for applying a leakage magnetic field to a magnetic sensor (that is, a surface opposed to the magnetic sensor) is facing upward with a magnetic medium arranged horizontally, the term "deep" means the state where the surface is close to the lower surface of the magnetic medium, and the term "shallow" means the state where the surface is close to the upper surface of the magnetic medium (the surface for applying the leakage magnetic field to the magnetic sensor (the surface opposed to the magnetic sensor))

The same parts or members are designated by the same reference numerals throughout the drawings unless otherwise specified.

First, a description will be given of how the structure of the present disclosure has been made in order to solve the above problems of the present disclosure.

The present inventors have intensively studied to achieve the object mentioned above of providing a magnetic medium, a magnetic encoder, and a method for manufacturing a magnetic medium with high reliability that can obtain a sufficient signal output while reducing a hysteresis error, thus obtaining the following findings. That is, after performing bias magnetization on a magnetic medium from its upper surface, the magnetic medium is signal-magnetized from its upper surface in the same manner, and then a bias leakage magnetic field from a bias magnetization region is applied to a magnetic sensor at an interface between a first magnetization region magnetized in one direction by the signal magnetization, and a second magnetization region magnetized in the direction opposite to the one direction by the same signal magnetization. As a result, even though an in-plane component of the signal magnetic field in a magnetoresistive face is almost eliminated, the bias magnetic field continues to be applied to the magnetoresistive face of the magnetic sensor, which can reduce hysteresis errors. The bias magnetization is overwritten with the signal magnetization near the center of the first magnetization region and near the center of the second magnetization region. The signal leakage magnetic field from the signal magnetization region is not affected by the bias leakage magnetic field from the bias magnetization region, so that the sufficient signal output can be obtained. As a result of intensive study based on the above findings, embodiments of the present invention have been made.

(First Embodiment)

For better understanding of the present disclosure, first, the structure and function of a magnetic encoder including a magnetic sensor with a magnetoresistive effect element and a magnetic medium will be described below with reference to FIG. 1. The magnetic medium can be linearly provided to produce a linear type magnetic encoder. Alternatively, a ring-like magnetic medium can be provided over an outer peripheral surface of a drum in a ring-like shape to produce a drum magnetic encoder. Therefore, it is to be understood to those skilled in the art that the drum magnetic encoder can be implemented based on a specific example of the linear magnetic encoder below.

FIG. 1 is a schematic diagram of a linear magnetic encoder (hereinafter simply referred to as a "magnetic encoder or encoder") 1 according to one embodiment of the present invention. As shown in FIG. 1, the linear magnetic encoder 1 of one embodiment of the present invention includes a magnetic sensor 2 with one or more magnetoresistive effect elements (for example, a giant magnetoresistive effect (GMR) element etc.), and a magnetic medium 3 having a magnetization pattern whose magnetization direction changes in a certain cycle λm and adapted to be movable relatively to the magnetic sensor 2. The expression "to be movable relatively to the magnetic sensor 2" as used herein means not only that the magnetic medium 3 moves respective to the magnetic sensor 2, but also that the magnetic sensor 2 moves respective to the magnetic medium 3. The expression "movable/move" as used in the present disclosure means not only the state of movement with the magnetic sensor 2 and the magnetic medium 3 spaced apart from each other (as shown in FIG. 1, the magnetic sensor 2 is spaced apart from the magnetic medium 3 by a distance $G_A$ which is hereinafter referred to as an "air gap"), but also the state of movement with the magnetic sensor 2 in contact with the magnetic medium 3, that is, the state of sliding between the magnetic sensor 2 and the magnetic medium 3.

Figure 2:
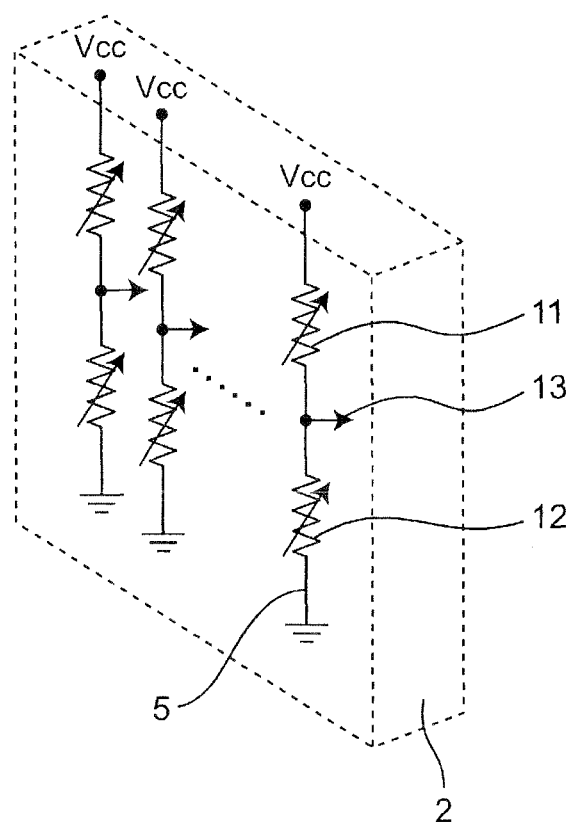
FIG. 2 is a schematic diagram of a magnetic sensor opposed to a magnetic medium.

FIG. 2 is a schematic diagram of the magnetic sensor 2 disposed opposed to the magnetic medium (not shown). As shown in FIG. 2, the magnetic sensor 2 includes at least one or more magnetic sensor elements 5. The magnetic sensor element 5 may be fabricated by connecting magnetosensitive sensor elements 11 and 12 in series whose electric resistance changes with magnetic field. More specifically, for example, one end of the magnetosensitive sensor element 11 is connected to one end of the magnetosensitive sensor element 12 with the other end of the magnetosensitive sensor element 12 grounded and the other end of the magnetosensitive sensor element 11 connected to a power source voltage Vcc. A midpoint potential is taken out of a connection point 13 between the magnetosensitive sensor elements 11 and 12. The voltage of the midpoint potential serves as an output voltage from the magnetic sensor 2. The magnetosensitive sensor elements 11 and 12 are preferably configured to have anti-parallel magnetosensitive axes which produce the maximum output. The change in midpoint potential is detected as a relative position signal between the magnetic sensor 2 and the magnetic medium 3.

Normally, magnetic encoders with the following features are used as a premise: i) an electric resistance changes only depending on a magnetic field within a magnetosensitive face (magnetic field in parallel to the magnetosensitive face), and ii) a magnetic medium is signal-magnetized so that N and S are reversed, and when moving a magnetic sensor along a signal-magnetized surface of the thus-obtained magnetic medium, an output from the magnetic sensor follows a sine wave. Such a magnetic encoder, however, generates a phase shift of the output signal from the magnetic sensor between the case of moving (or rotating) the magnetic medium rightward with respect to the magnetic sensor, and the case of moving (or rotating) the magnetic medium leftward with respect to the magnetic sensor when the magnetic medium is not bias-magnetized as mentioned later.

Figure 3A:
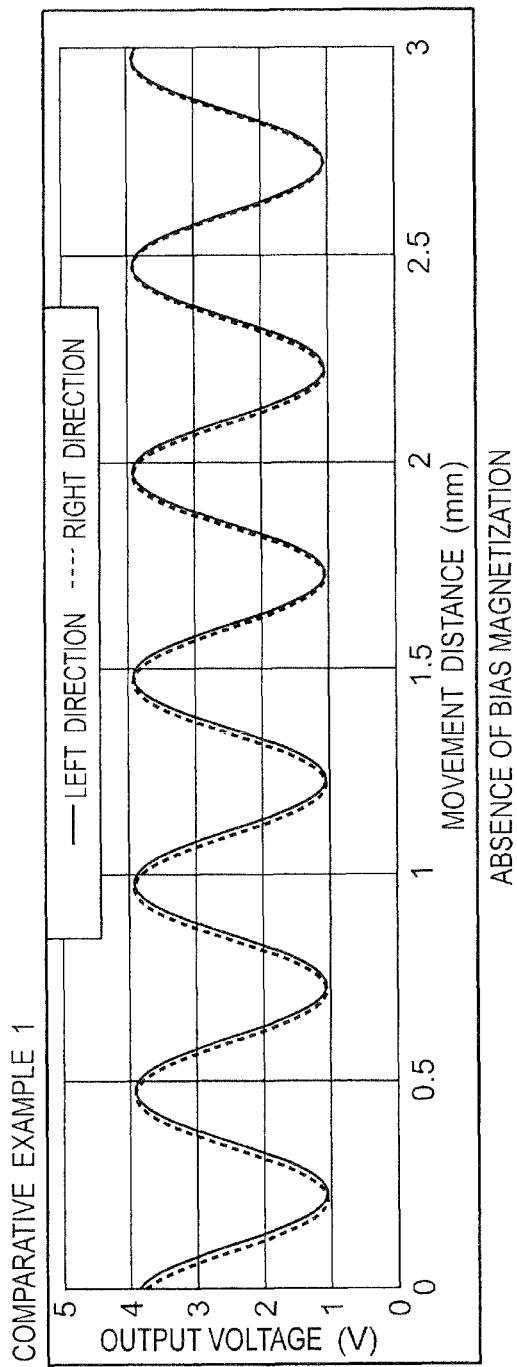
FIGS. 3A and 3B are graphs showing sine waves obtained by the magnetic encoder.
Figure 3B:
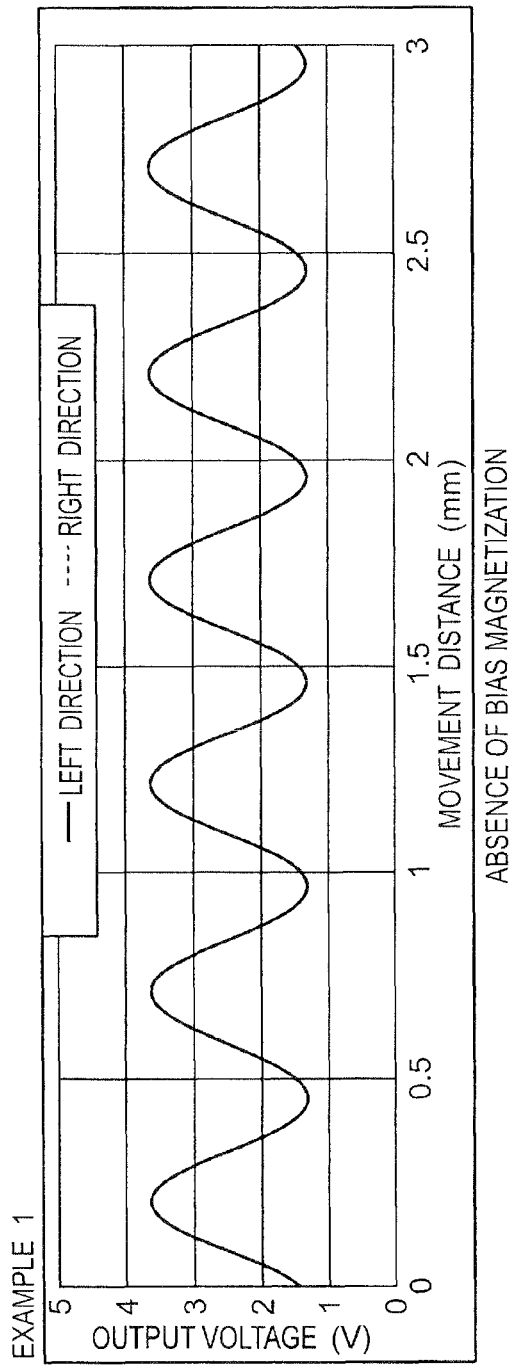

FIG. 3A shows the result (Comparative Example 1) of measurements obtained by use of the magnetic sensor produced only by signal-magnetizing the magnetic medium without providing any magnet for causing bias magnetic field and without bias-magnetizing the magnetic medium. In contrast, FIG. 33 shows the result (Example 1) of measurements obtained by use of the magnetic sensor that has performed bias magnetization and signal magnetization on the magnetic medium. Referring to FIGS. 3A and 3B, a horizontal axis indicates a movement distance (mm) of the magnetic medium 3 with respect to the magnetic sensor 2, and a longitudinal axis indicates an output voltage (V) from the magnetic sensor 2. FIGS. 3A and 3B illustrate waveforms output from the magnetic sensor when the magnetic medium 3 and magnetic sensor 2 are relatively moved in the left and right directions.

As shown in FIG. 3A (Comparative Example 1), in the magnetic encoder with the magnetic medium subjected only to the signal magnification without bias magnification, there occurs a phase shift in output waveform between the case of moving (or rotating) the magnetic medium 3 in the right direction and the case of moving (or rotating) the magnetic medium 3 in the left direction. When one cycle of the wavelength output from the magnetic sensor is 500 µm, the phase shift is about 19.3 µm (which corresponds to an electric angle of 13.9° of the sine wave), which is so large as not to be allowable for a device/apparatus requiring precise operations.

Therefore, in order to improve the signal accuracy of a magnetic encoder using a magnetic sensor, such as an AMR sensor or a GMR sensor, it is essential to reduce a hysteresis error of the magnetic sensor.

The magnetic sensor passes through a region where most of magnetic components detectable by the magnetic sensor substantially become zero (that is, near an interface where a magnetization direction is switched with the minimum signal magnetization). In this case, one of primary factors causing the hysteresis error of the magnetic encoder results from a magnetic hysteresis of the magnetic sensor (magnetoresistive effect element) magnetized by the magnetic field generated immediately before the magnetic sensor passes through the region. Such a hysteresis error could interrupt an increase in resolution of movement detected by the magnetic sensor. Particularly, a spin valve GMR element or TMR element with a high sensitivity has a larger output than an AMR element, resulting in a large hysteresis error, which is not preferable for enhancing the resolution. To reduce such an error, a method for applying a bias magnetic field to an interface where the magnetization direction changes is used.

As mentioned above, there is proposed a method for applying the bias magnetic field, for example, a method for setting a permanent magnet on a side surface of the magnetic medium, or a method for performing bias magnetization on the magnetic medium. The former method involves placing the permanent magnet, which makes it difficult to reduce its size, at a side surface of the magnetic medium, leading to an increase in size and cost of the structure of the magnetic encoder, which is unpractical.

The latter method is proposed which involves uniformly bias-magnetize the magnetic layer of the magnetic medium. As the bias magnetic field excessively becomes small, the effect of the bias magnetic field is reduced. On the other hand, as the bias magnetic field excessively becomes large, the reproduced output from the magnetic sensor becomes smaller, which makes it difficult to perform the signal magnetization.

For this reason, when a magnetic coercive force of the magnetic sensor is less than about 0.5 mT, an optimal magnetic field strength for the bias magnetization is preferably in a range of about 0.5 to 5 mT, which is slightly larger than the magnetic coercive force.

As shown in FIG. 1, the region requiring a bias leakage magnetic field (bias magnetic field) that leaks from the bias magnetization is an interface 21 where the signal magnetization is minimized and the magnetization direction is shifted. In a position 22 located at the substantially center between the interfaces 21, as shown in FIG. 1, the leakage magnetic field form the signal magnetization is maximized to saturate the magnetic sensor 2, which does not cause the hysteresis error.

Figure 4:
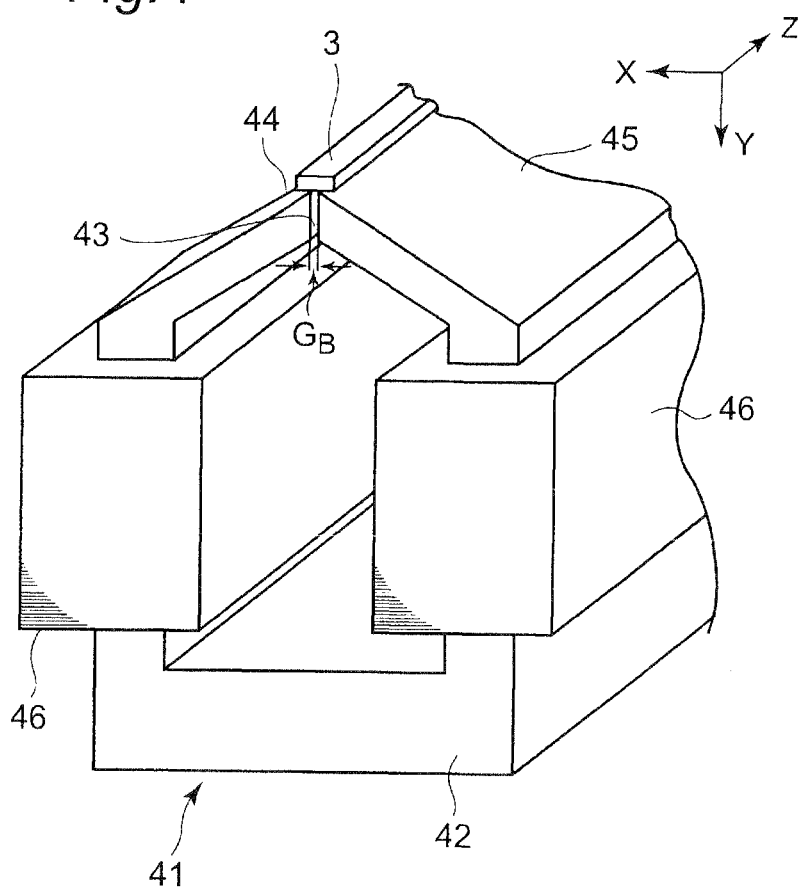
FIG. 4 is a schematic perspective view of a magnetic head to be used for fabricating the magnetic encoder in one embodiment of the present invention.
Figure 5A:
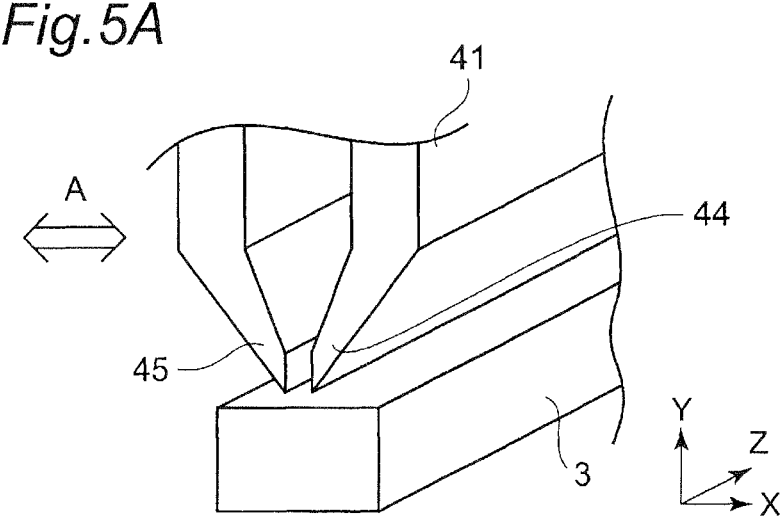
FIGS. 5A, 5B, and 5C are schematic diagrams for explaining bias magnetization.
Figure 5B:
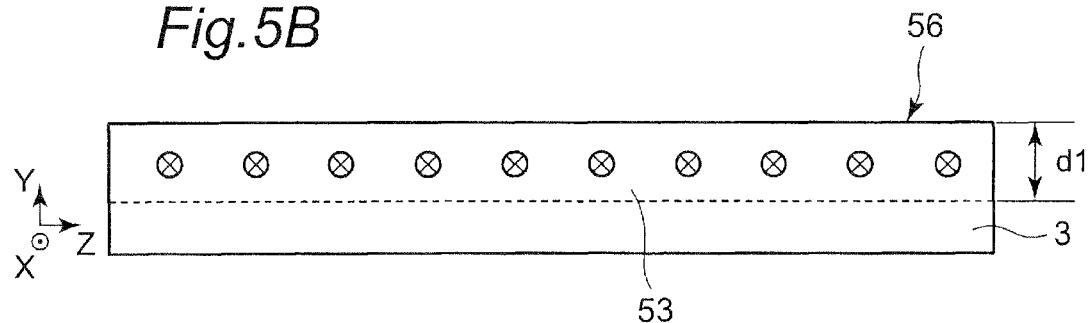
Figure 5C:
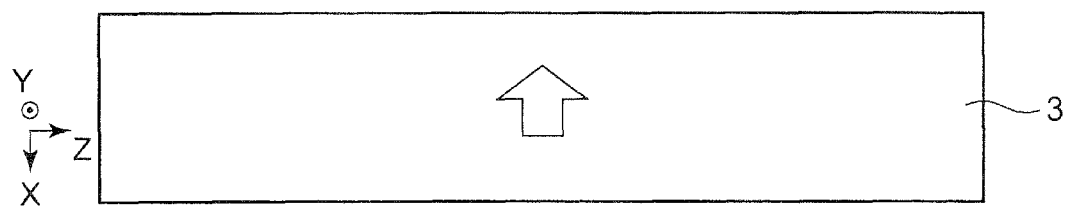

A method for achieving the optimal bias magnetic field strength is as follows. First, bias magnetization will be described below using FIGS. 4 and 5. FIG. 5A is a diagram showing a positional relationship between a magnetic head 41 and a magnetic medium 3 in performing the bias magnetization, FIG. 5B is a side view of the magnetic medium 3 subjected to the bias magnetization, and FIG. 5C is a top view thereof. As shown in FIG. 5A, first, the magnetic medium 3 is bias-magnetized in one direction (for example, either of two directions A) perpendicular to the longitudinal direction (or direction Z) of the magnetic medium 3. FIG. 4 shows a magnetic head 41 used for the bias magnetization and the subsequent signal magnetization. As shown in FIG. 4, it is preferred that a magnetic yoke 42 has both ends 44 and 45 thereof separated from each other in an upper portion 43 of the magnetic yoke 42, and other parts thereof except for both the ends 44 and 45 form a continuous magnetic path. This is because the leakage of the magnetic flux is reduced to result in good efficiency. A number of shapes (such as, a rectangular parallelepiped shape or column shape) other than the shape indicated in FIG. 4 can be adopted as the shape of the magnetic yoke 42. As mentioned above, by configuring both ends 44 and 45 so as to project outward, it is possible to concentrate the magnetic flux in the gap between the ends 44 and 45, and thus resulting in good efficiency. It is preferred that a length (corresponding to a length measured along a direction perpendicular to the gap direction) of the magnetic yoke 42 is larger than that of the object to be magnetized, so that the magnetic medium 3 is magnetized by parallel magnetic fields. For example, in case that the magnetic head 41 is used for the bias-magnetization, it is preferred that the length of the magnetic yoke 42 is larger than a longitudinal length of the magnetic medium 3 (a length measured along Z direction). In contrast, in case that the magnetic head 41 is used for the signal-magnetization, it is preferred that the length of the magnetic yoke 42 is larger than a width of the magnetic medium 3 (a length measured along X direction). A distance between the separated ends 44 and 45 of the magnetic yoke 42 is represented by reference character $G_B$. The yoke 42 is made of magnetic material. In particular, it is preferred to use the magnetic material having small coercive force and large magnetic permeability. The magnetic head 41 includes the magnetic yoke 42 made of soft magnetic material, and a coil 46 that generates a magnetic field in the magnetic yoke 42 by allowing a magnetization current to flow therethrough. In the magnetic head 41 for the signal magnetization, the gap length $G_B$ is smaller than a pitch λm of the signal magnetization. In this way, the magnetic head 41 with the gap $G_B$ is provided in such a manner that a gap formation direction (direction Z) of the magnetic head 41 is identical to the longitudinal direction of the magnetic medium 3 as shown in FIG. 5A, thereby performing the bias magnetization. At this time, as shown in FIGS. 5B and 5C, the magnetization head is moved in either the direction X or −X (that is, in either of both directions A), while allowing the DC current to flow therethrough at a certain voltage as the magnetization current, whereby the magnetic medium is magnetized in a depth d1 from its upper surface.

Figure 6A:
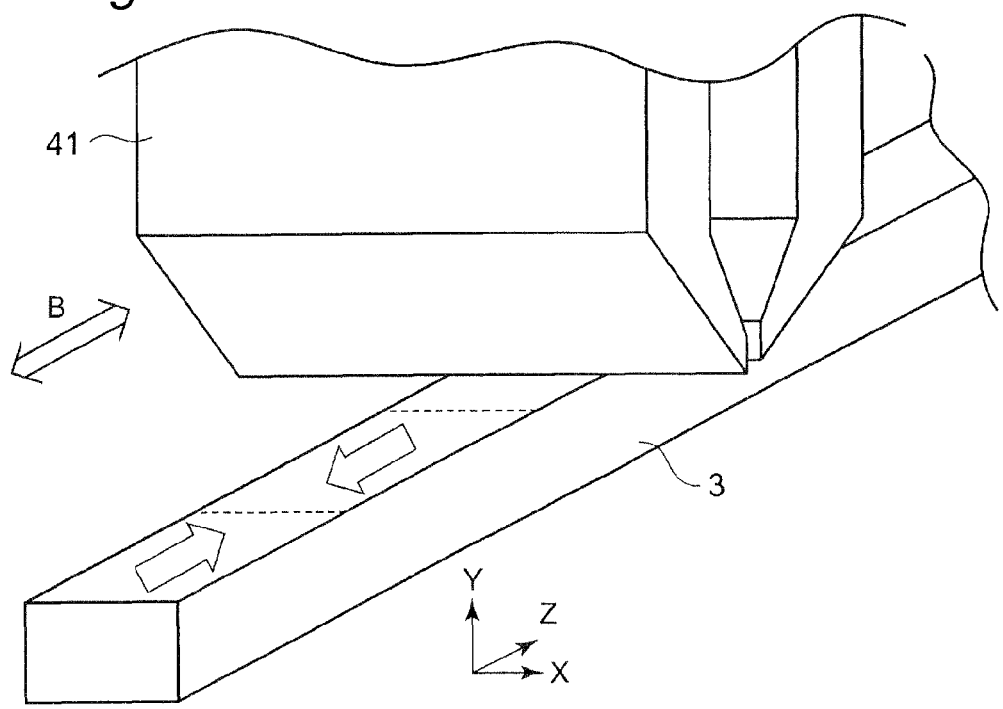
FIGS. 6A, 6B, and 6C are schematic diagrams for explaining signal magnetization.
Figure 6B:
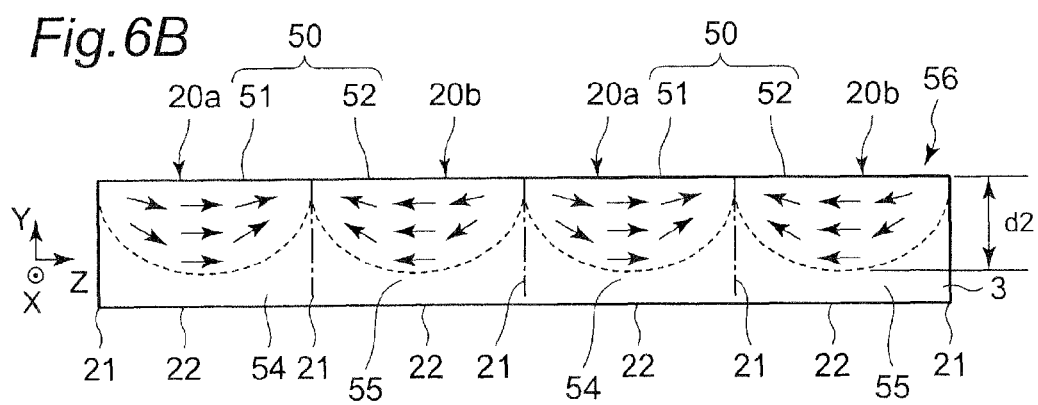
Figure 6C:
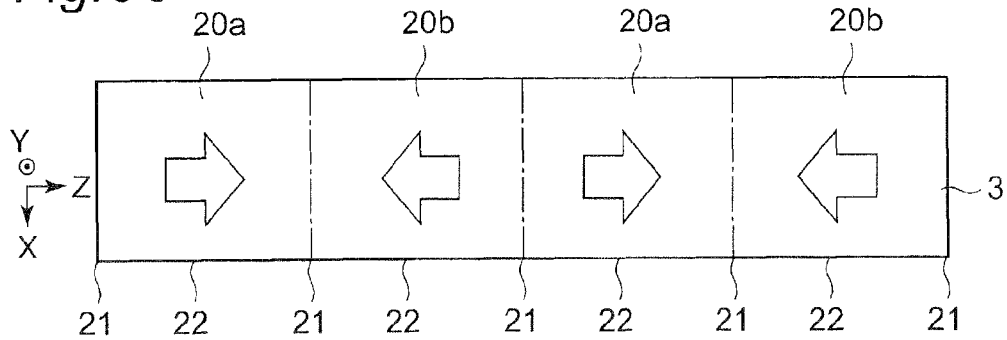
Figure 7A:
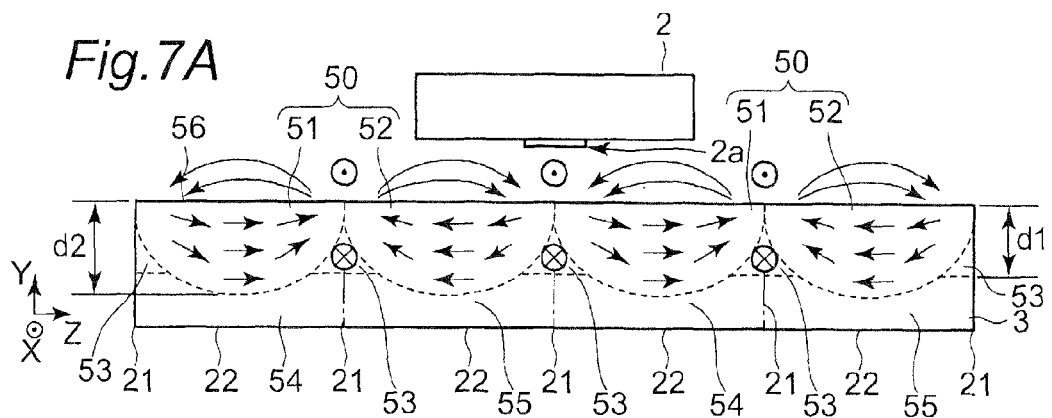
FIGS. 7A, 7B, 7C, and 7D are schematic diagrams of the magnetic encoder after the bias magnetization and signal magnetization.
Figure 7B:
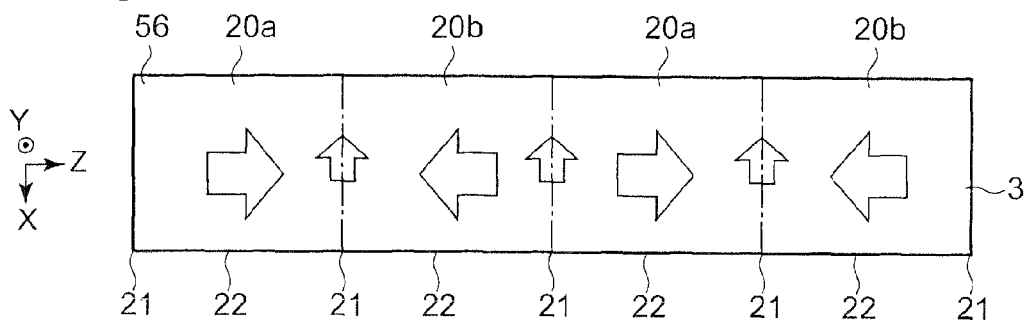

Then, the signal magnetization will be described below using FIGS. 6A, 6B, and 6C. FIG. 6A is a diagram showing the positional relationship between the magnetic head 41 and the magnetic medium 3 in performing the signal magnetization, FIG. 6B is a side view of the magnetic medium 3 subjected to the signal magnetization, and FIG. 6C is a top view thereof. After the bias magnetization, as shown in FIG. 6A, the magnetic head 41 is moved in either the direction Z or −Z along the magnetic medium 3 (that is, in either of both directions B), whereby as shown in FIGS. 6B and 6C, the magnetic medium 3 bias-magnetized is subjected to the signal magnetization. The signal magnetization is performed in such a manner that a depth of a signal magnetization region is shallower than that of a bias magnetization region at the interface 21 where the magnetization direction of the signal magnetization changes, and in such a manner that a maximum magnetization depth d2 of the signal magnetization region is deeper than the magnetization depth d1 of the bias magnetization region in the position 22 at the substantially center between the interfaces 21. In this way, as shown in FIGS. 7A and 7B, the magnetization depth d1 of the bias magnetization is shallower than the maximum magnetization depth d2 of the signal magnetization in the position 22 at the substantially center between the interfaces 21. As a result, in the region where the signal magnetization is to be maximized, the bias magnetization is substantially overwritten by magnetization with only the signal magnetization remaining therein. On the other hand, in a region near the interface 21 where the magnetization direction of the signal magnetization is switched, the magnetization depth of the signal magnetization is shallower than that of the bias magnetization, whereby as a result, the bias magnetization remains to some degree without being overwritten.

The bias magnetization remaining without being overwritten after the signal magnetization can apply a bias magnetic field to a region requiring the bias magnetic field (that is, to a region with the minimum signal magnetization near the interface 21 where the magnetization direction of the signal magnetization is switched, for example, at the interface 21), which can reduce the hysteresis error. Further, by adjusting the depth of the bias magnetization as well as the depth of the signal magnetization, the optimal bias magnetic field strength can be adjusted.

That is, the present inventors have found out that the magnetic medium 3 is magnetized in the following manner, which can reduce the hysteresis error without reducing the reproducing output of the magnetic sensor 2 to some degree. That is, the magnetic medium 3 is magnetized in such a manner that near the interface 21 where the magnetization direction of the magnetic medium 3 changes, the depth d2 of the signal magnetization region is shallower than the depth d1 of the bias magnetization region, and that in the position 22 located substantially at the center between the interfaces 21, the maximum magnetization depth d2 of the signal magnetization is deeper than the depth d1 of the bias magnetization region.

The magnetic encoder 1 according to embodiments of the present invention, which comprises the magnetic medium 3 and the magnetic sensor 2, will be described in detail below.

Figure 7C:
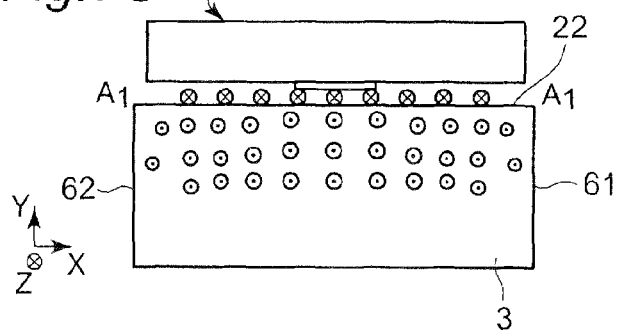

FIGS. 7A, 7B, 7C, and 7D show schematic diagrams of the magnetic medium 3 shown in FIG. 1. FIG. 7A is a cross-sectional view taken along the line B-B of the magnetic medium 3 through its center in the width direction shown in FIG. 1, showing the state of the magnetization and the magnetic field obtained after the bias magnetization to be mentioned later and the following signal magnetization. FIG. 7B is a top view of the magnetic medium 3, showing the state of the magnetization of the medium. FIG. 7C is a cross-sectional view of the section taken along the line $A_1$-$A_1$ shown in FIG. 1, that is, of the section oriented in parallel to the interface 21 where the magnetization direction is switched, and which does not include the interface 21.

Figure 7D:
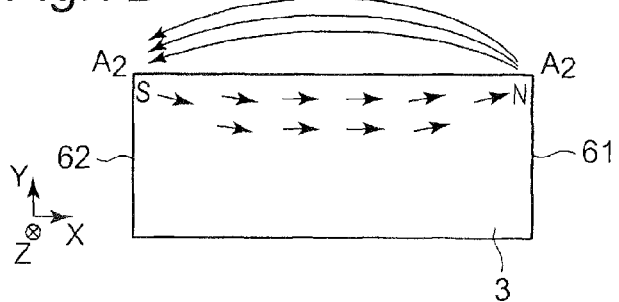

FIG. 7D is a cross-sectional view of the section taken along the line $A_2$-$A_2$ shown in FIG. 1, that is, of the section oriented in parallel to the interface 21, and which includes the interface 21.

Referring to FIG. 7A, an arrow inside the magnetic medium indicates the direction of the magnetization. The arrow indicative of the magnetization is oriented from the S pole to the N pole. An arrow outside the magnetic medium 3 (that is, the arrow located above the upper surface of the magnetic medium 3) indicates the direction of the magnetic field. The arrow indicative of the magnetic field direction is oriented from the N pole to the S pole. Reference character indicative of X within a circle designates the direction from the upper side to the lower side with respect to the paper surface, whereas reference character indicative of a dot within a circle designates the direction from the lower side to the upper side with respect to the paper surface.

As shown in FIG. 7A, the magnetic medium 3 has a signal magnetization region 50. The signal magnetization region 50 is composed of a first magnetization region 51 magnetized in a first direction (for example, in the direction Z) in parallel to the magnetosensitive face, and a second magnetization region 52 magnetized in a second direction (for example, in the direction −Z) opposed to the first direction. The signal magnetization region 50 is formed at an upper surface 56 of the magnetic medium 3, that is, at the surface 56 (surface opposed to the magnetic sensor) that applies the leakage magnetic field to the magnetic sensor 2 (i.e., magnetoresistive effect element 2a). As shown in FIG. 7A, the first magnetization region 51 is formed by signal magnetization of the magnetic medium in the direction Z. Thus, the magnetic field in the direction −Z is generated above the upper surface 56 of the magnetic medium 3. As shown in FIG. 7A, the second magnetization region 52 is formed by signal magnetization of the magnetic medium in the direction −Z. Thus, the magnetic field in the direction Z is generated above the upper surface 56 of the magnetic medium 3. In this way, the upper surface 56 of the magnetic medium 3 generates the magnetic fields whose directions are alternately reversed. The magnetic sensor 2 is moved along the thus-obtained signal-magnetized surface of the magnetic medium 3, whereby the output from the magnetic sensor 2 follows a sine wave. When using the magnetic medium 3 in the magnetic encoder 1, the movement direction or movement amount of a moving member, or a rotation angle or the like of a rotary member can be easily detected.

The magnetization direction and the direction of the magnetic field corresponding thereto, of the first magnetization region 51 and the second magnetization region 52 in the signal magnetization region 50 are not limited to the above-mentioned directions. Alternatively, the magnetization direction may be a direction opposite to the above-mentioned direction. That is, the first magnetization region 51 is signal-magnetized in the direction −Z, whereby the magnetic field corresponding thereto may be formed in the direction Z. On the other hand, the second magnetization region 52 is signal-magnetized in the direction Z, whereby the magnetic field corresponding thereto may be formed in the direction −Z. As will be mentioned later, the direction of the signal magnetization may be inclined with respect to the direction Z (or direction −Z) (for example, in the range of ±5°). For example, it is likely that the magnetization direction inclines so that a tip of the magnetization direction comes close to stronger magnetization pole or that a location gap between the magnetic head 41 and the magnetic medium 3 occurs in the regions near poles of the signal-magnetization region as well as near the side surfaces 61 and 62. When the inclined angle of the direction of the signal magnetization with respect to the direction Z (or direction −Z) is in the above range, the movement direction or movement amount of a moving member, or a rotation angle or the like of a rotary member can be easily detected.

The magnetic medium 3 has a bias magnetization region 53 formed near the interface 21 where the magnetization direction is switched (in a region between the first magnetization region 51 and the second magnetization region 52) with the surface 56 of the magnetic medium 3 faced upward and opposed to the magnetic sensor 2. Further, no bias magnetization region 53 is formed in a central lower part 54 of the first magnetization region 51 and in a central lower part 55 of the second magnetization region 52.

The term "signal magnetization region 50" as used in the present disclosure means a region in which the signal magnetization is predominant over the bias magnetization and which is magnetized at a strength of a half or more of the perfect magnetization. The term "perfect magnetization" as used herein means a state where a magnetic medium cannot be magnetized at a higher strength any more even though the magnetic field strength for magnetization is made stronger. The term "bias magnetization region 53" as used herein means a region in which the bias magnetization is predominant over the signal magnetization and which is magnetized at a strength of a half or more of the perfect magnetization in the same way as mentioned above. The phrase "no bias magnetization region 53 is formed in a central lower part (i.e., a region designated by reference numeral 54) of the first magnetization region 51" as used herein means that the signal magnetization is stronger than the bias magnetization in the region, which can make the influence on the bias magnetization negligible.

As shown in FIG. 1, the bias magnetization region 53 is provided by forming a N pole near one side surface 61 of the magnetic medium 3 as well as an S pole near the other side surface 62 of the magnetic medium 3. That is, as illustrated by reference character indicative of X within a circle in FIG. 7A, the bias magnetization region 53 is formed to be bias-magnetized in the direction from the upper side to the lower side with respect to the paper surface (that is, in the direction −X) Thus, as illustrated by reference character indicative of a dot within a circle in FIG. 7A, a magnetic field is generated above the upper surface of the magnetic medium 3 in the direction from the lower side to the upper side with respect to the paper surface (that is, in the direction X). In this way, the bias magnetization region 53 is formed in the direction −X at the interface 21, which can reduce the hysteresis error to be mentioned later.

The magnetization direction and the direction of a magnetic field corresponding thereto of the bias magnetization region 53 are not limited to the above-mentioned directions. Alternatively, the magnetization direction may be the direction X (that is, the direction from the lower side to the upper side with respect to the paper surface), and the direction of the magnetic field may be the direction −X (that is, the direction from the upper side to the lower side with respect to the paper surface). As will be mentioned later, the direction of the bias magnetization may be inclined with respect to the direction X (or direction −X) (for example, in the range of ±5°). For example, it is likely that a location gap between the magnetic head 41 and the magnetic medium 3 occurs. When the inclined angle of the direction of the signal magnetization with respect to the direction Z (or direction −Z) is in the above range, the hysteresis error can also be reduced in the same manner as mentioned above.

FIG. 7C is a cross-sectional view taken along the line $A_1$-$A_1$ of FIG. 1 as mentioned above. As shown in FIG. 7C, the second signal magnetization region 52 magnetized in the direction −Z exists on the section taken along the lint $A_1$-$A_1$. It can be understood that the magnetic medium 3 even in the signal magnetization region 50 has been subjected to the bias magnetization in the direction x, so that the bias magnetization region has existed. However, as illustrated by the section taken along the line $A_1$-$A_1$, the signal magnetization is performed after the bias magnetization, whereby the bias magnetization in the direction X has been overwritten by the signal magnetization in the direction −Z. On the other hand, as shown in FIG. 7C, the magnetic field is generated at the upper surface of the magnetic medium 3 from the upper side to the lower side with respect to the paper surface.

As shown in FIG. 7D, the section taken along the line $A_2$-$A_2$ includes the interface 21 where the magnetization direction changes. The section taken along the line $A_2$-$A_2$ does not have the signal magnetization region. In the section taken along the line $A_2$-$A_2$, however, the magnetic medium is magnetized in the direction X by the bias magnetization. Since the bias magnetization is not overwritten by the signal magnetization, as shown in FIG. 7D, the bias magnetization region 53 bias-magnetized in the direction X is formed.

As shown in FIG. 7D, the magnetic field is formed on the section taken along the line $A_2$-$A_2$ by the bias magnetization in the direction X, whereby the leakage magnetic field from the bias magnetization region is applied to the magnetic sensor 2. As a result, even if an in-plane component of the magnetosensitive face of the signal magnetic field is almost eliminated, the bias magnetic field continues to be applied vertically with respect to one direction and the other opposite direction within the magnetosensitive face of the magnetic sensor, which can reduce the hysteresis error.

As shown in FIG. 7C, the magnetic medium is magnetized in the direction −Z by the signal magnetization so as to pass through the section taken along the line $A_1$-$A_1$, which can produce the sufficient signal output.

The magnetic medium 3 in a first embodiment of the present invention can be fabricated by mixing ferromagnetic material, such as ferrite powder or rare-earth magnetic powder, in a moldable non-magnetic material, including organic resin or rubber, such as epoxy resin, and molding the mixture. Alternatively, the magnetic medium 3 can be fabricated by molding ferromagnetic powder, and sintering the molded powder. The depth of the magnetic medium 3 is preferably one time or more as large as the signal magnetization pitch. The upper limit of the depth of the magnetic medium 3 may be set arbitrarily according to the design. The width of the magnetic medium 3 is preferably one time or more as large as the signal magnetization pitch. When the width of the magnetic medium 3 is excessively large, the bias magnetic field does not sufficiently reach the magnetic medium. For this reason, the width of the magnetic medium 3 is preferably about five times or less as deep as the depth thereof. The length of the magnetic medium 3 is arbitrarily determined according to the design, but is preferably at least four times or more as long as the signal magnetization pitch.

In the first embodiment of the present invention, both the signal magnetization region 50 and the bias magnetization region 53 are not preferably magnetized up to the lower surface of the magnetic medium 3. That is, as shown in FIG. 7A, it is important that the lowermost parts of the first and second magnetization regions 51 and 52 forming the signal magnetization region 50 are positioned above the lower surface of the magnetic medium 3, while the lowermost part of the bias magnetization region 53 is positioned above the lower surface of the magnetic medium 3.

Referring to FIG. 7A, it is also important that the maximum magnetization depth of the signal magnetization region 50 is deeper than the maximum magnetization depth of the bias magnetization region 53. The term "maximum magnetization depth" as used herein means a depth in the deepest position of the magnetization region, corresponding to a vertical distance from the upper surface of the magnetic medium to the deepest position in the magnetization region.

More specifically, the depth of the signal magnetization region is set shallower than that of the bias magnetization region at the interface 21 where the magnetization direction of the signal magnetization changes, and the maximum magnetization depth d2 of the signal magnetization region is set deeper than the magnetization depth d1 of the bias magnetization region in the position 22 at the substantially center between the interfaces 21.

With this structure, the signal magnetization region remains, which can detect the output requiring for determining the relative movement direction (relative rotation direction) of the magnetic medium 3 with respect to the magnetic sensor 2, thereby determining the relative movement direction (relative rotation direction). The bias magnetization remaining without being overwritten after the signal magnetization can apply the bias magnetic field to a region requiring the bias magnetic field (that is, to a region with the minimum signal magnetization near the interface where the magnetization direction of the signal magnetization is switched, for example, at the interface 21), which can reduce the hysteresis error.

In the first embodiment of the present invention, the magnetic encoder includes the magnetic sensor 2 for detecting a magnetic field within the magnetosensitive face, and the magnetic medium 3 relatively moving with respect to the magnetic sensor as mentioned above.

In the first embodiment of the present invention, the magnetic medium 3 applies a cyclic signal leakage magnetic field generated from the signal magnetization region 50 to the magnetic sensor 2 by being relatively moved with respect to the magnetic sensor 2, and also applies a cyclic bias leakage magnetic field generated from the bias magnetization region 53 to the magnetic sensor. With this arrangement, the magnetic sensor 2 can receive the strong signal leakage magnetic field generated from the magnetic medium 3, thereby ensuring an output amplitude of the magnetic sensor 2 with a high S/N ratio, and can also receive the bias magnetic field generated from the magnetic medium 3, thereby reducing the hysteresis error of the magnetic sensor 2.

As the magnetic sensor 2 used for the magnetic encoder 1 according to the first embodiment of the present invention, a number of sensors can be used, as long as they can statically detect the magnetic field, possess the magnetic hysteresis, and have a possibility that the magnetic hysteresis would occur when they move relatively to the magnetic medium. As the magnetoresistive effect elements, for example, an anisotropic magnetoresistive effect (AMR) element, a giant magnetoresistive effect (GMR) element (e.g., a coupled magnetoresistive effect element, a spin valve giant magnetoresistive effect (SVGMR) element), a tunneling magnetoresistive effect (TMR) element, and the like, can be used. In the following, the use of the SVGMR element containing Ni—Fe alloy and Co—Fe alloy having the hysteresis therein will be explained by way of example. However, it is to be understood to those skilled in the art that embodiments of the present invention can be implemented by means of other magnetoresistive effect elements.

Figure 8:
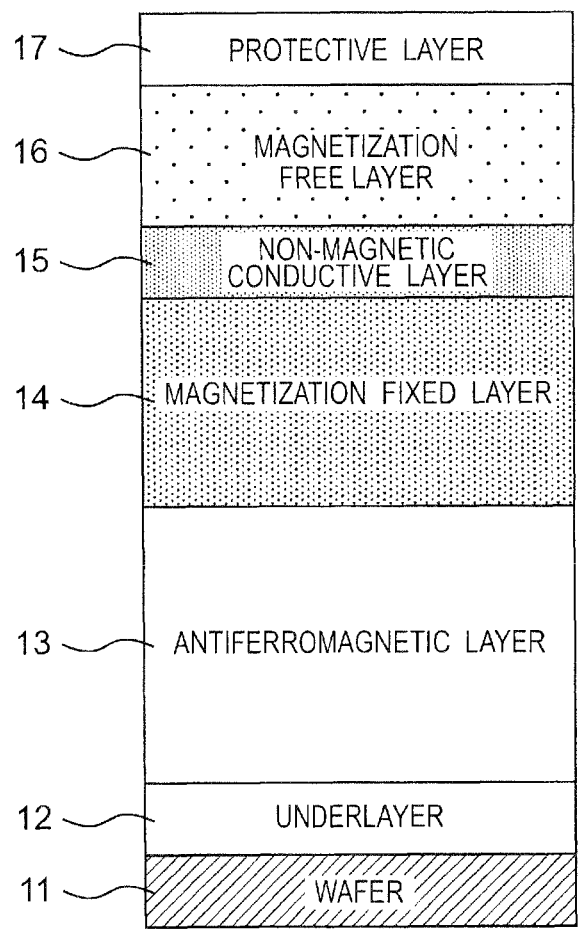
FIG. 8 is a cross-sectional view of a film structure showing one example of a specific structure of a spin valve giant magnetoresistive effect (SVGMR) element used in the magnetic sensor.

FIG. 8 shows the structure of the spin valve giant magnetoresistive effect (SVGMR) element 2a as the magnetic sensor 2 for detecting the magnetic field within the magnetosensitive face. FIG. 8 illustrates an example of the film structure. The SVGMR element 2a is fabricated by depositing an underlayer 12, an antiferromagnetic layer 13, a magnetization fixed layer 14, a non-magnetic conductive layer 15, a magnetization free layer 16, and a protective layer 17 over a glass wafer 11 in that order, for example, by sputtering or the like. The external magnetic field causes the magnetization of the magnetization free layer 16 to rotate in the surface of a laminated structure, thus changing an electric resistance depending on a relative angle formed between the magnetization direction of the magnetization free layer 16 and the magnetization direction of the magnetization fixed layer 14.

A method for fabricating the magnetic medium will be described below. In fabricating the magnetic encoder of one embodiment of the present invention, as shown in FIG. 5A, first, the magnetic head 41 is used to perform the bias magnetization on the magnetic medium 3. The bias magnetization applies the bias magnetic field to the magnetic medium 3 from the upper surface thereof in one direction (for example, in the direction −X) perpendicular to the longitudinal direction (the direction Z) of the magnetic medium 3. The excessively strong bias magnetization makes it impossible to overwrite the bias magnetization with the signal magnetization as mentioned later. The bias magnetization preferably has a strength of ½ or less of the strength of the signal magnetization, and more preferably ⅕ or more and ½ or less thereof. The direction of the bias magnetization is not limited to one direction −X, and may be inclined with respect to the direction −X. An angle formed between the direction of the bias magnetization and the direction −X is preferably within ±5°.

Subsequently, as shown in FIG. 6A, the signal magnetization is performed on the magnetic medium 3 bias-magnetized. The signal magnetization is performed by applying the signal magnetization on the magnetic medium 3 already bias-magnetized from its upper surface 56 in the longitudinal direction (in the direction Z) of the magnetic medium 3 with a predetermined pitch (more specifically, of 100 μm to 5,000 μm, preferably 200 μm to 1,000 μm, and more preferably 400 μm to 800 μm in case that, for example, a ferrite is used). Here, magnetization while reversing the direction of the magnetic field of the magnetization applied with the predetermined pitch is hereinafter referred to as an "alternate magnetization". As shown in FIGS. 6A to 6C, the alternate magnetization is performed as the signal magnetization, so that a magnetization pattern with reversed magnetization directions can be formed. Elements whose magnetization directions are reversed from each other in this way are hereinafter referred to as magnetic medium elements 20a and 20b. The magnetic medium element 20a is provided with the first magnetization region 51, and the magnetic medium element 20b is provided with the second magnetization region 52. The magnetic head with a gap length slightly smaller than the above-mentioned pitch is used to perform the signal magnetization (alternate magnetization), while being moved. The gap of the magnetic head is 10% or more and 70% or less of the pitch of the signal magnetization, and preferably 40% or more and less than 50%. The magnetic head can reverse the magnetic field direction of the magnetization magnetic field by changing the direction of current flowing through the magnetic head according to an amount of movement of the head to thereby adjust timing of changing the movement speed of the magnetic head or the direction of the current, which can magnetize the magnetic medium with a pitch of the gap length or longer. Thus, the magnetization direction is reversed in the following way: N-S, S-N, N-S, S-N, and the like, so that the magnetization pattern can be formed with a distance between the poles N-S or S-N set to the predetermined pitch.

Referring to FIG. 7A, the signal magnetization is performed in such a manner that the depth of each of the signal magnetization regions 51 and 52 is shallower than that of the bias magnetization region 53 at the interface 21 where the magnetization direction of the signal magnetization changes within the magnetic medium 3. Further, the signal magnetization is also performed in such a manner that the maximum magnetization depth d2 of each of the first and second signal magnetization regions 51 and 52 is deeper than the depth d1 of the bias magnetization region 53 in each of the central lower portions 54 and 55 of the first and second signal magnetization regions, that is, in the position 22 at the substantial center between the interfaces 21. Near the interface 21, the bias magnetization region 53 remains, whereby the magnetic sensor 2 continues to constantly detect the bias magnetic field in the same direction (direction −X). Even though the hysteresis in the different directions remains in the magnetic sensor due to the leakage magnetic field of the last signal magnetization, the magnetic sensor 2 can constantly detect the bias magnetic field in the same direction (in the direction −X) to suppress the phase shift.

When performing the signal magnetization on the magnetic medium 3, as shown in FIGS. 7A to 7D, the magnetization depth of the magnetic medium 3 signal-magnetized is minimized at the interface 21, and maximized in the position 22 at the substantially center between the interfaces 21. In the position 22 at the substantially center between the interfaces 21, the magnetization depth of the bias magnetization is shallower than the maximum magnetization depth of the signal magnetization. As a result, in a part where the magnetization depth of the signal magnetization near the central position 22 is deeper than the magnetization depth of the bias magnetization, the bias magnetization is overwritten with the signal magnetization, leaving the signal magnetization region. That is, near the intermediate position 22, an output from the magnetic medium 3 required to determine its relative movement direction (relative rotation direction) with respect to the magnetic sensor 2 can be detected to thereby determine the relative movement direction (relative rotation direction).

In the magnetic encoder 1 of one embodiment of the present invention, in the position 22 at the substantially center between the interfaces 21, the maximum magnetization depth d2 of the signal magnetization is preferably twice or more, and more preferably twice to five times as deep as the magnetization depth d1 of the bias magnetization. If the maximum magnetization depth d2 of the signal magnetization is less than twice as deep as the magnetization depth d1 of the bias magnetization in the position 22 at the substantially center between the interfaces 21, the output detected by the magnetic sensor 2 becomes smaller. This seems to be because the bias magnetization cannot be sufficiently overwritten, thus making it difficult to detect the signal magnetization as mentioned above. If the maximum magnetization depth d2 of the signal magnetization is five times or more as large as the magnetization depth d1 of the bias magnetization in the position 22 at the substantially center between the interfaces 21, hysteresis errors are generated in the output from the magnetic sensor. This seems to be because the bias magnetization is completely overwritten, and as a result no bias magnetization remains. Therefore, when the magnetization depth d1 of the bias magnetization in the position 22 at the substantially center between the interfaces 21 is within such a range, it is possible to appropriately determine the relative movement direction (relative rotation direction), and also to simultaneously set the bias magnetization and the signal magnetization on the magnetic medium 3.

Specifically, in order to set the maximum magnetization depth d2 of the signal magnetization in the position 22 at the substantially center between the interfaces 21 to twice or more as deep as the magnetization depth d1 of the bias magnetization, the magnetic field strength for the signal magnetization is twice or more as strong as that for the bias magnetization. That is, after the bias magnetization, the signal magnetization is performed at a magnetic field strength which is twice or more as strong as the magnetic field strength for the bias magnetization. Specifically, in order to set the maximum magnetization depth of the signal magnetization in the position 22 at the substantially center between the interfaces 21 to five times or less as deep as the magnetization depth of the bias magnetization, the magnetic field strength for the signal magnetization is five times or less as strong as that for the bias magnetization. That is, after the bias magnetization, the signal magnetization is performed at a magnetic field strength which is five times or less as strong as the magnetic field strength for the bias magnetization. Thus, the maximum magnetization depth d2 of the signal magnetization in the position 22 at the substantially center between the interfaces 21 can be set twice as deep as the magnetization depth d1 of the bias magnetization.

The presence or absence of the structure according to one embodiment of the present invention can be confirmed by checking whether the phase shift is caused due to a difference in relative movement direction. FIG. 3B shows a waveform obtained by the magnetic encoder 1 fabricated by the method for manufacturing in one embodiment of the present invention. That is, as shown in FIGS. 5B and 5C, the magnetic medium 3 is bias magnetized in one direction (in the direction X) from its upper surface to a position at the depth d1 from the upper surface. Then, as shown in FIGS. 6B and 6C, the magnetic medium 3 subjected to the bias magnetization is signal-magnetized as will be explained below, while the magnetic head 41 is moved in the direction Z along the magnetic medium 3. That is, the signal magnetization is performed in such a manner that the depth d2 of the signal magnetization region is shallower than the depth d1 of the bias magnetization region in the interface 21 where the magnetization direction of the signal magnetization changes, and that the maximum magnetization depth d2 of the signal magnetization region is deeper than the magnetization depth d1 of the bias magnetization region in the position 22 at the substantially center between the interfaces 21.

FIG. 3A shows a waveform obtained by the magnetic encoder 1 subjected to only the signal magnetization without performing the bias magnetization.

As can be seen from FIG. 3B, there is no phase shift between the movement of the magnetic medium 3 rightward with respect to the magnetic sensor 2 and the movement of the magnetic medium 3 leftward with respect to the magnetic sensor 2. It is found that in the interface 21 where the magnetization direction of the signal magnetization changes, the depth d2 of the signal magnetization region is shallower than the depth d1 of the bias magnetization region, and, as a result, the bias magnetization region is formed under the first and second magnetization regions of the signal magnetization region near the interface 21 between the first and second magnetization regions of the signal magnetization region. When the bias magnetization region is not formed at the interface 21, as shown in FIG. 3A, the phase shift occurs due to the magnetic hysteresis of the magnetic sensor when a relative movement direction between the magnetic sensor 2 and the magnetic medium 3 is reversed. On the other hand, when the depth d2 of the signal magnetization region is shallower than the depth d1 of the bias magnetization region at the interface 21, and thus the bias magnetization region is formed under the first and second magnetization regions of the signal magnetization region near the interface 21, the bias magnetic field can be applied thereto in the interface 21 by the remaining bias magnetization which has not been overwritten by the signal magnetization. Thus, the hysteresis error can be reduced to suppress the phase shift. When the phase shift does not occur, it can be found that the depth d2 of the signal magnetization region is shallower than the depth d1 of the bias magnetization region in the interface 21 where the magnetization direction of the signal magnetization changes, and the bias magnetization region is formed in a region from the surface of the magnetic medium 3 to a position at a predetermined distance d1 from the surface of the magnetic medium 3 at or near the interface 21 between the first and second magnetization regions of the signal magnetization region.

By confirming whether the phase shift occurs or not in this way, it can be confirmed whether or the magnetic medium and the magnetic encoder of embodiment of the present invention have the structure mentioned above.

EXAMPLES

The magnetic encoder 1 according to embodiment 1 of the present invention was manufactured by performing the above mentioned bias magnetization and signal magnetization to the magnetic medium 3 and placing the magnetic sensor 2 opposite to the magnetic medium 3. A SVGMR sensor as indicated in FIG. 8 was used as the sensor 2. A ferrite bond magnet having a saturated magnetic field strength of 290 mT was used as the magnetic medium 3.

Example 1

In a magnetic encoder 1 subjected to the bias magnetization and the signal magnetization according to the first embodiment of the present invention, the magnetic medium 3 was moved in each of the left and right directions with respect to the magnetic sensor 2 by 3 mm, and in the respective movements, outputs from the magnetic encoder 1 were measured. The result is shown in FIG. 3B.

Example 2

Figure 9:
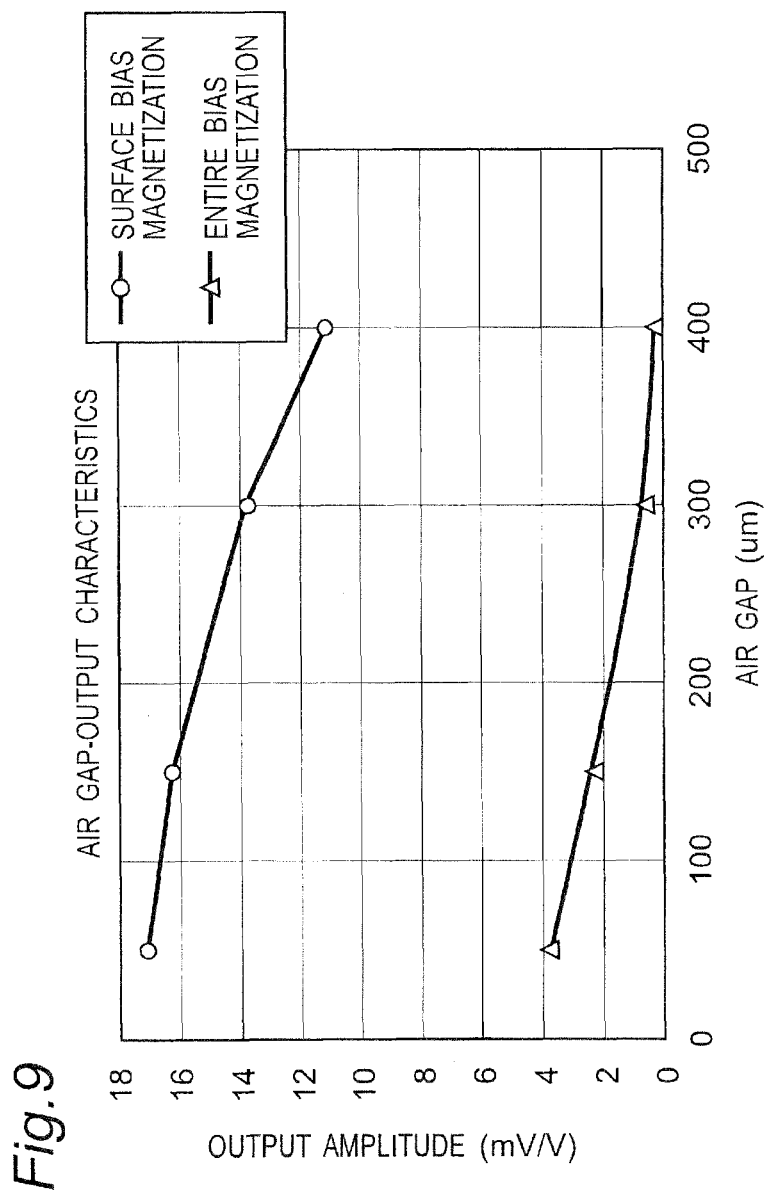
FIG. 9 is a graph showing air gap-output characteristics obtained in a magnetic encoder subjected to an entire bias magnetization, and in a magnetic encoder subjected to a surface bias magnetization according to one embodiment of the present invention.
Figure 10:
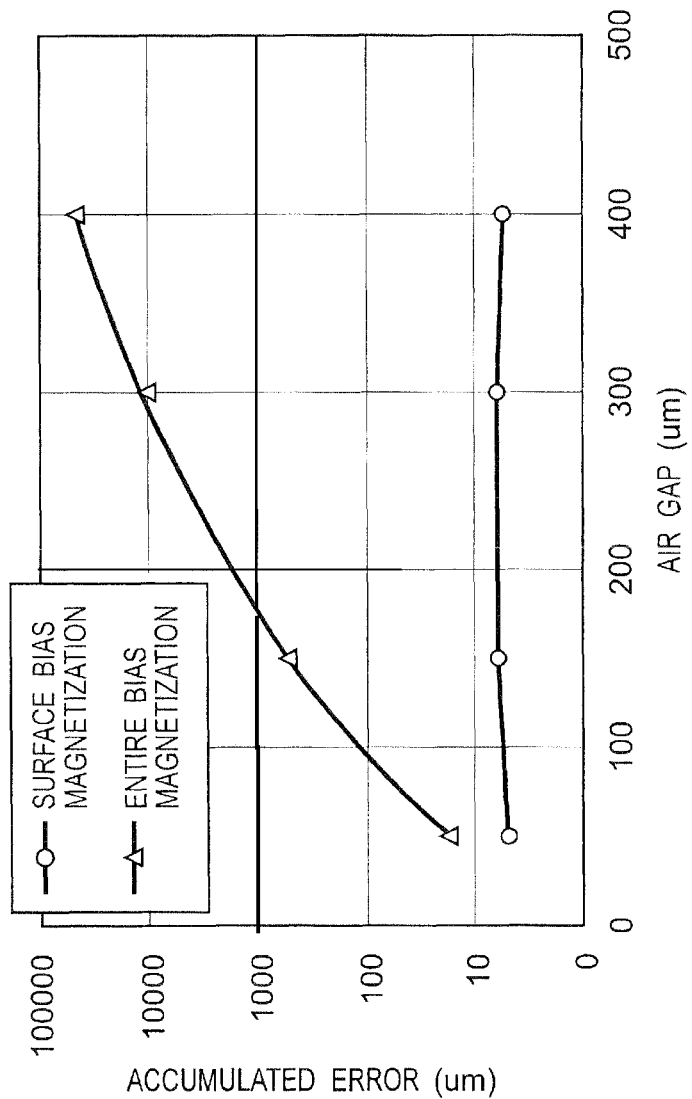
FIG. 10 is a graph showing air gap-accumulated error characteristics obtained in a magnetic encoder subjected to an entire bias magnetization, and in a magnetic encoder subjected to a surface bias magnetization according to one embodiment of the present invention.

In the magnetic encoder subjected to the bias magnetization and the signal magnetization in the first embodiment of the present invention, the air gap $G_A$ as a distance between the magnetic sensor and the magnetic medium was changed in a range from 50 μm to 400 μm to thereby determine the output amplitude (see FIG. 9) and accumulated error (see FIG. 10). The output amplitude is shown in FIG. 9 and the accumulated error is shown in FIG. 10.

Comparative Example 1

In a magnetic encoder 1 obtained without the bias magnetization in Example 1, the magnetic medium 3 was moved in each of the left and right directions with respect to the magnetic sensor 2 by 3 mm, and in the respective movements, outputs from the magnetic encoder were measured. The result is shown in FIG. 3A.

Comparative Example 2

In the magnetic encoder of the related art having a magnetic medium all of which was subjected to the bias magnetization in Example 2, the air gap $G_A$ as a distance between the magnetic sensor and the magnetic medium was changed in a range from 50 μm to 400 μm to thereby determine the output amplitude (see FIG. 9) and accumulated error (see FIG. 10). The output amplitude is shown in FIG. 9 and the accumulated error is shown in FIG. 10. In FIGS. 9 and 10 and the following description, the magnetization according to the present disclosure is hereinafter referred to as a "surface bias magnetization", and the magnetization in the related art is hereinafter referred to as an "entire bias magnetization".

In the magnetic encoder not subjected to the bias magnetization, as shown in FIG. 3A, the phase shift was caused between the rightward movement of the magnetic medium with respect to the magnetic sensor and the leftward movement of the magnetic medium with respect to the magnetic sensor. As mentioned above, the magnetic sensor passes through a region where most of magnetic components detectable by the magnetic sensor substantially become zero (that is, near the interface where the magnetization direction is switched with the minimum signal magnetization). In this case, the hysteresis error is caused by a magnetic hysteresis of the magnetic sensor magnetized by the magnetic field generated immediately before the magnetic sensor passes through the region. To suppress the hysteresis error, the bias magnetization region is formed in such a manner that the depth of the signal magnetization region is shallower than that of the bias magnetization region in the interface 21 between the first and second magnetization regions of the signal magnetization region. Thus, the hysteresis error can be reduced, which can suppress the phase shift mentioned above as shown in FIG. 3B.

FIG. 9 is a graph showing comparison of air gap-output characteristics between Example 2 and Comparative Example 2. The term "air gap" as used herein means a distance between the magnetic sensor and the magnetic medium. This figure illustrates the influence on the output by the attachment accuracy of the magnetic encode. When performing the surface bias magnetization, which involves bias-magnetizing only the surface of the magnetic medium, as shown in FIG. 9, the output amplitude was large as compared to the entire bias magnetization which involves bias-magnetizing the magnetic medium from its front surface to its back surface as a whole.

For example, at the air gap of 50 μm, an output amplitude of the magnetic encoder subjected to the surface bias magnetization was about 17.0 mV/V, whereas an output amplitude of the magnetic encoder subjected to the entire bias magnetization was about 3.8 mV/V. In this case, the output amplitude of the magnetic encoder subjected to the surface bias magnetization was four times or more as large as the output amplitude of the magnetic encoder subjected to the entire bias magnetization.

For example, at the air gap of 150 μm, an output amplitude of the magnetic encoder subjected to the surface bias magnetization was about 16.2 mV/V, whereas an output amplitude of the magnetic encoder subjected to the entire bias magnetization was about 2.2 mV/V. In this case, the output amplitude of the magnetic encoder subjected to the surface bias magnetization was seven times or more as large as the output amplitude of the magnetic encoder subjected to the entire bias magnetization.

For example, at the air gap of 300 µm, an output amplitude of the magnetic encoder subjected to the surface bias magnetization was about 13.8 mV/V, whereas an output amplitude of the magnetic encoder subjected to the entire bias magnetization was about 0.5 mV/V. In this case, the output amplitude of the magnetic encoder subjected to the surface bias magnetization was 27 times or more as large as the output amplitude of the magnetic encoder subjected to the entire bias magnetization.

For example, at the air gap of 400 µm, an output amplitude of the magnetic encoder subjected to the surface bias magnetization was about 11.1 mV/V, whereas an output amplitude of the magnetic encoder subjected to the entire bias magnetization was about 0.1 mV/V. In this case, the output amplitude of the magnetic encoder subjected to the surface bias magnetization was 100 times or more as large as the output amplitude of the magnetic encoder subjected to the entire bias magnetization.

As mentioned above, under the same air gap, the output amplitude of the magnetic encoder subjected to the surface bias magnetization was found to be larger than that of the magnetic encoder subjected to the entire bias magnetization.

When performing the surface bias magnetization in this way, the maximum magnetization depth d2 of the signal magnetization region can be set to be deeper than the magnetization depth d1 of the bias magnetization region in the position 22 at the substantially center between the interfaces 21. In the position 22 at the substantially center between the interfaces 21, the signal magnetization region made of the first or second magnetization region is formed, and under the first and/or second magnetization regions near the center of the first and/or second magnetization regions, no bias magnetization regions can be formed.

In contrast, when performing the entire surface bias magnetization, the bias magnetization will be performed on the magnetic medium from its front surface to its back surface to thereby form the bias magnetization region in the maximum depth that can form the signal magnetization region. In this case, in the position 22 at the substantially center between the interfaces 21, the maximum magnetization depth d2 in the signal magnetization region cannot be set to be deeper than the magnetization depth d1 of the bias magnetization region. As a result, the entire bias magnetization could not produce the structure in which the signal magnetization region made of the first or second magnetization region was formed in the position 22 at the substantially center between the interfaces 21, and no bias magnetization region could be formed under the first and/or second magnetization regions near the center of the first and/or second magnetization regions.

As mentioned above, when performing the surface bias magnetization, in the position 22 at the substantially center between the interfaces 21, the signal magnetization region made of the first or second magnetization region is formed, and no bias magnetization region can be formed under the first and/or second magnetization regions near the center of the first and/or second magnetization regions, resulting in a strong strength of a signal leakage magnetic field due to the signal magnetization, and a large output amplitude of the magnetic encoder.

FIG. 10 is a graph showing air gap-accumulated error characteristics in Example 2 and Comparative Example 2. These are measurements of accumulated errors obtained by measuring movement amounts of the magnetic encoder subjected to the entire bias magnetization with the same structure as that of FIG. 9 as well as the magnetic encoder subjected to the surface bias magnetization while changing the corresponding air gap. In the surface bias magnetization, as shown in FIG. 10, the accumulated error was found to be very small as compared to the case of the entire bias magnetization.

For example, at the air gap of 50 µm, an accumulated error of the magnetic encoder subjected to the surface bias magnetization was about 5.3 µm, whereas an accumulated error of the magnetic encoder subjected to the entire bias magnetization was about 17.3 µm. In this case, the accumulated error of the magnetic encoder subjected to the surface bias magnetization was one 3.2nd (1/3.2) or less as large as the accumulated error of the magnetic encoder subjected to the entire bias magnetization.

At the air gap of 150 µm, an accumulated error of the magnetic encoder subjected to the surface bias magnetization was about 6.1 µm, whereas an accumulated error of the magnetic encoder subjected to the entire bias magnetization was about 524.4 µm. In this case, the accumulated error of the magnetic encoder subjected to the surface bias magnetization was one 86th (1/86) or less as large as the accumulated error of the magnetic encoder subjected to the entire bias magnetization.

At the air gap of 300 dm, an accumulated error of the magnetic encoder subjected to the surface bias magnetization was about 6.5 µm, whereas an accumulated error of the magnetic encoder subjected to the entire bias magnetization was about 1154.1 µm. In this case, the accumulated error of the magnetic encoder subjected to the surface bias magnetization was one 177.6th (1/177.6) or less as large as the accumulated error of the magnetic encoder subjected to the entire bias magnetization.

At the air gap of 400 µm, an accumulated error of the magnetic encoder subjected to the surface bias magnetization was about 6.2 µm, whereas an accumulated error of the magnetic encoder subjected to the entire bias magnetization was about 48090.1 µm. In this case, the accumulated error of the magnetic encoder subjected to the surface bias magnetization was one 7756.5th (1/7756.5) or less as large as the accumulated error of the magnetic encoder subjected to the entire bias magnetization.

As mentioned above, under the same air gap, the accumulated error of the magnetic encoder subjected to the surface bias magnetization was found to be much smaller than that of the magnetic encoder subjected to the entire bias magnetization. In the entire bias magnetization, as the air gap is increased, the accumulated error becomes extremely larger. On the other hand, in the surface bias magnetization, even though the air gap is increased, the accumulated error hardly changes to be substantially constant.

Factors increasing the accumulated error mainly include a distortion of a signal waveform, variations in signal amplitude, and a ratio of an output amplitude to a noise component included in a signal. In this way, when performing the surface bias magnetization, in the position 22 at the substantially center between the interfaces 21, the signal magnetization region made of the first or second magnetization region is formed, and no bias magnetization region can be formed under the first and/or second magnetization regions near the center of the first magnetization region and/or second magnetization regions, resulting in a strong strength of a signal leakage magnetic field due to the signal magnetization, and a large output amplitude of the magnetic encoder. Thus, the ratio of the output amplitude to the magnetic and electric noise caused by the magnetic encoder can become larger, resulting in a small accumulated error. In contrast, when performing the entire surface bias magnetization, the bias magnetization is performed on the magnetic medium from its front surface to its back surface to thereby form the bias magnetization region in the maximum depth that can form the signal magnetization region. For this reason, in the position 22 at the substantially center between the interfaces 21, the maximum magnetization depth d2 in the signal magnetization region cannot be set to be deeper than the magnetization depth d1 of the bias magnetization region. As a result, the strength of the signal leakage magnetic field due to the signal magnetization becomes weak, whereby the output amplitude from the magnetic encoder cannot be increased. Thus, the ratio of the output amplitude to the magnetic and electric noise caused by the magnetic encoder might become smaller, resulting in a large accumulated error. Therefore, as mentioned above, the surface bias magnetization can drastically decrease the accumulated error of the magnetic encoder as compared to the entire bias magnetization.

DESCRIPTION OF REFERENCE NUMERALS

1: Linear magnetic encoder (magnetic encoder, encoder)
2: Magnetic sensor
3: Magnetic medium
21: Interface where a magnetization direction of signal magnetization changes
22: Position at the substantially center between interfaces

What is claimed is:

1. A magnetic medium relatively movable with respect to a magnetic sensor for detecting a magnetic field in a magnetosensitive face, the magnetic medium comprising:
  a signal magnetization region including a first magnetization region magnetized in a first direction being in parallel with the magneto sensitive face and a second magnetization region magnetized in a second direction opposed to the first direction, the first magnetization region and the second magnetization region being alternately arranged along the first direction or the second direction; and
  a bias magnetization region magnetized in a third direction, the third direction intersecting both the first and second directions, and being in parallel with the magnetosensitive face, wherein
  while a surface of the magnetic medium opposed to the magnetic sensor is placed to face upward,
  the bias magnetization region is formed under the first magnetization region and the second magnetization region near an interface between the first magnetization region and the second magnetization region, and no bias magnetization regions are formed under the first magnetization region near a center of the first magnetization region and under the second magnetization region near a center of the second magnetization region.

2. The magnetic medium according to claim 1, wherein both the signal magnetization region and the bias magnetization region are not magnetized up to a lower surface of the magnetic medium.

3. The magnetic medium according to claim 1, wherein maximum magnetization depth of the signal magnetization region is deeper than a maximum magnetization depth of the bias magnetization region.

4. A magnetic encoder, comprising:
  (i) a magnetic sensor including a magnetoresistive effect element possessing a hysteresis error, and being designed to detect a magnetic field in a magnetosensitive face of the magnetoresistive effect element; and
  (ii) a magnetic medium relatively movable with respect to the magnetic sensor for detecting a magnetic field in a magnetosensitive face, the magnetic medium comprising:
  a signal magnetization region including a first magnetization region magnetized in a first direction being in parallel with the magnetosensitive face and a second magnetization region magnetized in a second direction opposed to the first direction, the first magnetization region and the second magnetization region being alternately arranged along the first direction or the second direction; and
  a bias magnetization region magnetized in a third direction, the third direction intersecting both the first and second directions, and being in parallel with the magnetosensitive face, wherein
  while a surface of the magnetic medium opposed to the magnetic sensor is placed to face upward,
  the bias magnetization region is formed under the first magnetization region and the second magnetization region near an interface between the first magnetization region and the second magnetization region, and no bias magnetization regions are formed under the first magnetization region near a center of the first magnetization region and under the second magnetization region near a center of the second magnetization region;
  the magnetic medium moving relatively to the magnetic sensor.

5. The magnetic encoder according to claim 4, wherein a cyclic signal leakage magnetic field generated from the signal magnetization region is applied to the magnetic sensor, while a bias leakage magnetic field generated from the bias magnetization region is applied to the magnetic sensor by allowing the magnetic medium to move relatively to the magnetic sensor.

6. The magnetic encoder according to claim 4, wherein the magnetoresistive effect element is at least one selected from the group consisting of: an anisotropic magnetoresistive effect element; a giant magnetoresistive effect element; a coupled magnetoresistive effect element; a spin valve giant magnetoresistive effect element; and a tunneling magnetoresistive effect element.

7. A method for manufacturing a magnetic medium relatively movable with respect to a magnetic sensor for detecting a magnetic field in a magnetosensitive face, the magnetic medium comprising (A) a signal magnetization region having a first magnetization region magnetized in a first direction being in parallel with the magnetosensitive face and a second magnetization region magnetized in a second direction opposed to the first direction, the first magnetization region and the second magnetization region being alternately arranged along the first direction or the second direction; and (B) a bias magnetization region magnetized in a third direction, the third direction intersecting both the first and second directions, and being in parallel with the magnetosensitive face, wherein while a surface of the magnetic medium opposed to the magnetic sensor is placed to face upward, the bias magnetization region is formed under the first magnetization region and the second magnetization region near an interface between the first magnetization region and the second magnetization region, and no bias magnetization regions are formed under the first magnetization region near a center of the first magnetization region and under the second magnetization region near a center of the second magnetization region, the method comprising the steps of:
(i) bias-magnetizing the magnetic medium in the third direction; and
(ii) signal-magnetizing the magnetic medium so that a magnetization direction is reversed to be directed alternately in the first direction and in the second direction opposed to the first direction in a predetermined cycle.

8. The method for manufacturing a magnetic medium according to claim 7, wherein the signal magnetization and the bias magnetization magnetize the magnetic medium from its upper surface using a magnetic head for controlling a magnetic field with magnetization current.

9. The method for manufacturing a magnetic medium according to claim 7, wherein the magnetic field strength for magnetizing the signal magnetization region is twice or more as strong as the magnetic field strength for magnetizing the bias magnetization region.

10. The method for manufacturing a magnetic medium according to claim 7, wherein the magnetic head includes a magnetic yoke made of soft magnetic material, and a coil generating a magnetic field in the magnetic yoke by allowing a magnetization current to flow therethrough,
wherein the magnetic yoke has both ends thereof forming a certain gap length therebetween and generating the magnetic field, and
wherein the gap length in performing the signal magnetization is smaller than a cycle of the signal magnetization.

* * * * *